(12) United States Patent
Qin et al.

(10) Patent No.: US 10,976,552 B2
(45) Date of Patent: Apr. 13, 2021

(54) NEAR-EYE SYSTEM HAVING POLARIZATION WAVEGUIDE

(71) Applicant: Google LLC, Mountain View, CA (US)

(72) Inventors: Yi Qin, Mountain View, CA (US); Jerome Carollo, Mountain View, CA (US); Xinda Hu, Mountain View, CA (US); Oscar Martinez, Mountain View, CA (US); Serge Bierhuizen, San Jose, CA (US)

(73) Assignee: Google LLC, Mountain View, CA (US)

(*) Notice: Subject to any disclaimer, the term of this patent is extended or adjusted under 35 U.S.C. 154(b) by 139 days.

(21) Appl. No.: 16/159,258

(22) Filed: Oct. 12, 2018

(65) Prior Publication Data

US 2020/0117004 A1 Apr. 16, 2020

(51) Int. Cl.
*G02B 27/14* (2006.01)
*G02B 27/01* (2006.01)
*G02B 5/30* (2006.01)
*G02B 27/28* (2006.01)

(52) U.S. Cl.
CPC ....... *G02B 27/0172* (2013.01); *G02B 5/3083* (2013.01); *G02B 27/283* (2013.01); *G02B 2027/0178* (2013.01)

(58) Field of Classification Search
CPC ...... G02B 5/30; G02B 5/3025; G02B 5/3083; G02B 27/0172; G02B 27/283; G02B 27/28; G02B 27/01; G02B 2027/0178
USPC ............ 359/15, 489.07, 630, 631, 633, 641
See application file for complete search history.

(56) References Cited

U.S. PATENT DOCUMENTS

| | | | |
|---|---|---|---|
| 3,443,858 A | 5/1969 | La Russa | |
| 6,075,651 A | 6/2000 | Hoppe | |
| 6,304,303 B1 | 10/2001 | Yamanaka | |
| 9,091,851 B2 | 7/2015 | Border et al. | |
| 9,581,821 B2 | 2/2017 | McDowall et al. | |
| 2002/0159150 A1* | 10/2002 | King | G02B 27/283 359/485.05 |
| 2017/0052377 A1 | 2/2017 | Amitai | |
| 2017/0227770 A1* | 8/2017 | Carollo | G02B 27/0025 |
| 2018/0136460 A1 | 5/2018 | Bierhuizen et al. | |
| 2018/0180889 A1 | 6/2018 | Lee et al. | |
| 2018/0239146 A1 | 8/2018 | Bierhuizen et al. | |
| 2018/0267319 A1 | 9/2018 | Ouderkirk et al. | |
| 2020/0053350 A1* | 2/2020 | Hudman | G02F 1/1334 |

OTHER PUBLICATIONS

International Search Report and Written Opinion dated Dec. 12, 2019 for corresponding PCT Application No. PCT/US2019/053409, 16 pages.

* cited by examiner

*Primary Examiner* — Mahidere S Sahle (57) ABSTRACT

A near-eye display system includes a polarization waveguide having an in-coupling interface disposed proximate to a first end and an out-coupling interface disposed proximate to an opposite second end. The polarization waveguide is configured to convey light incident at the in-coupling interface to the out-coupling interface by inducing multiple changes in a polarization state of the light as the light traverses the polarization waveguide. At least a subset of the changes in polarization state induce the light to reflect within the polarization waveguide without relying on total internal reflection (TIR).

23 Claims, 7 Drawing Sheets

NEAR-EYE SYSTEM HAVING POLARIZATION WAVEGUIDE

BACKGROUND

Near-eye display systems typically employ a waveguide (also frequently referred to as a "lightguide") to convey light emitted by a display to a user's eye. In conventional implementations, the waveguide relies on total internal reflection (TIR) to convey light received from the display via in-coupling optics at one end of the waveguide to out-coupling optics facing the user's eye on the other end of the waveguide. To achieve TIR, such waveguides must be composed of material with a high index of refraction. However, implementation of such materials can be problematic. For one, the field of view (FOV) provided by a conventional TIR-based waveguide is inversely proportional to the index of refraction of the material of the waveguide, and thus the high index of refraction needed to achieve TIR impedes the FOV that can be provided by the waveguide, which typically is no more than 50 degrees. Moreover, waveguide materials with higher indices of refraction tend to be both heavier and more expensive than materials with lower indexes of refraction, and consequently conventional TIR-based waveguides tend to be more expensive and heavier. Additionally, systems employing TIR-based waveguides often must be sealed in order to reduce the risk of contamination of the surface of the waveguide, which can break the TIR condition and lead to light leakage. The mechanisms used to provide this seal often increase the cost, weight, and complexity of the system and are prone to failure.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-9 illustrate example implementations of a polarization waveguide for use in a near-eye display system. The near-eye display system uses the polarization waveguide (PWG) to convey light representative of display images from a micro-display or other display to a wearer's eye. However, unlike conventional waveguides that rely on total internal reflection (TIR) to convey light in such a manner, and with the attendant trade-offs, the PWG does not rely on TIR, but instead conveys a representation of the display light from an in-coupling interface facing the display to an out-coupling interface facing an eye through multiple changes of the polarization state of the representative light as it traverses the polarization waveguide, where at least a subset of these changes in the polarization state induce reflection of the representative light within the PWG. The changes in polarization state of the representative light from receipt of the display light at the in-coupling interface to a light extraction component of the polarization waveguide are implemented so as to facilitate reflection of the representative light due to its particular polarization state at a corresponding layer interface of the PWG. When the reflected light reaches the light extraction component, the light extraction component reflects the light toward the out-coupling interface, and in doing so changes the polarization state of the reflected light so as to permit the reflect light to traverse the layers of the PWG that served to reflect the light when the conveyed light was in other polarization states, and thus allowing the reflected light ultimately to emerge from the PWG at the out-coupling interface in an eyeward direction.

By manipulating the polarization state of the display light to enable reflection of the display light within the PWG until it is ultimately redirected eyeward, the PWG is able to convey the display light from the in-coupling interface to the out-coupling interface in a manner that is not reliant on total internal reflection (TIR), in contrast to conventional near-eye waveguides. As such, the waveguide substrate of the PWG which serves as the primary conduit for the display light between in-coupling and out-coupling can be implemented using optically transparent material with a lower index of refraction than the waveguide material used in conventional TIR-based waveguides, while also providing a higher FOV than such conventional waveguides for a material with a given index of refraction. Consequently, the PWG may be lighter and less expensive to manufacture. Moreover, because TIR is not necessary, the PWG may be implemented in a form factor that has non-parallel major surfaces or is non-planar. As an example, the PWG could be implemented in a form factor with one or both major surfaces being curved surfaces, and as such can be implemented to provide a non-zero optical power or implemented within an eyeglass lens fitted to an eyeglass frame.

Figure 1:
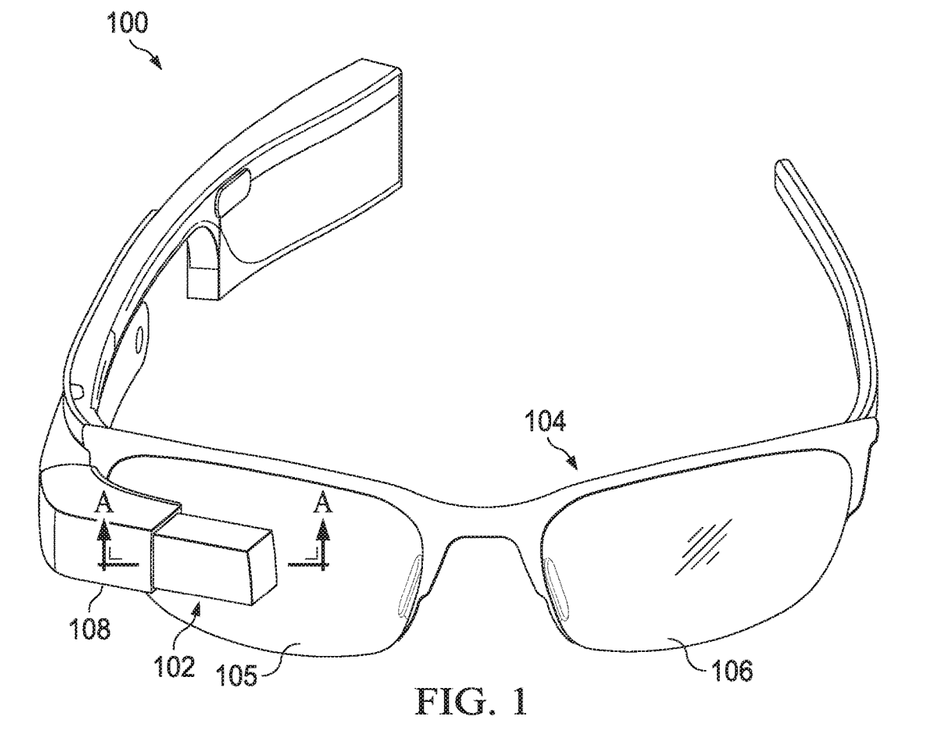
FIG. 1 is a front view of an example form factor for a near-eye display system employing a polarization waveguide in accordance with some embodiments.

FIG. 1 illustrates an example near-eye display system 100 employing a polarization waveguide (PWG) 102 in accordance with at least one embodiment. The system 100 is implemented in an eyeglass form factor having an eyeglass frame 104 with eyeglass lenses 105, 106 for a wearer's right eye and left eye, respectively. In the depicted embodiment, the PWG 102 is separate from the eyeglass lenses and instead overlies one of the eyeglass lenses (eyeglass lens 105 in this instance) such that an out-coupling interface (described in greater detail below with reference to FIG. 3) of the PWG 102 faces the expected position of the corresponding eye of the wearer. The PWG 102 is mounted to the eyeglass frame 104 via a waveguide mount housing 108, which also serves to house some or all of the electronic components (not illustrated in FIG. 1) of the near-eye display system 100, such as a display that generates augmented reality (AR) or (VR) imagery for display to the wearer via the PWG 102, an in-coupling optic to direct light from the display to an in-coupling interface of the PWG 102, one or more processors, wireless interfaces, batteries or other power sources, and the like. A number of these components are described in greater detail below.

Figure 2:
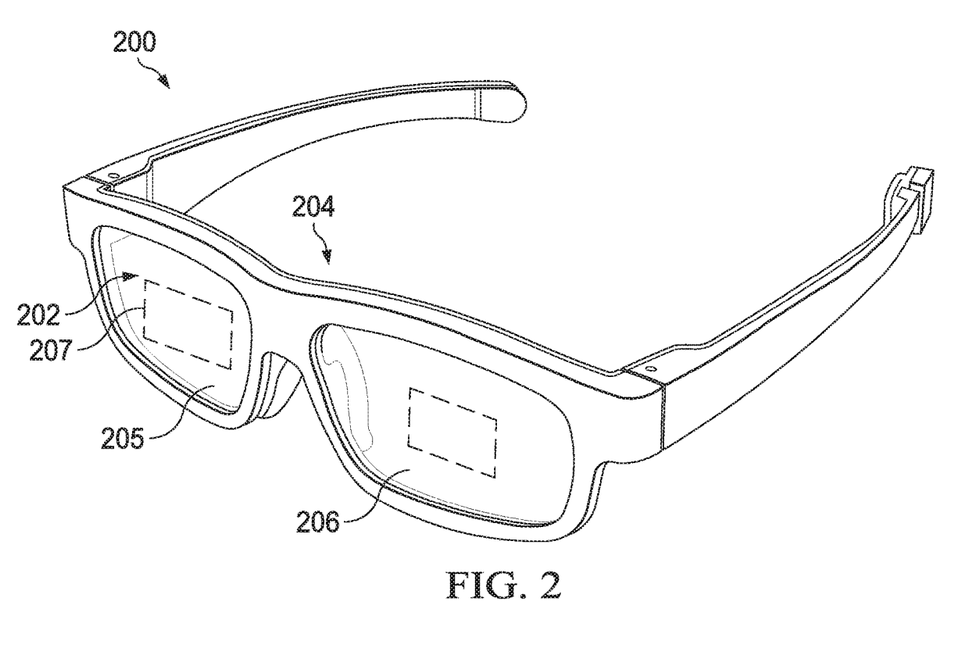
FIG. 2 is a perspective view of another example form factor for a near-eye display system employing a polarization waveguide in accordance with some embodiments.

FIG. 2 illustrates another example near-eye display system 200 employing a PWG 202 in accordance with at least one embodiment. As with the system 100 of FIG. 1, the system 200 employs an eyeglass form factor with an eyeglass frame 204 having eyeglass lenses 205, 206. However, in contrast with the system 100, the system 200 implements the PWG 202 using the eyeglass lens 205. That is, the PWG 202 is integrated within the eyeglass lens 205, and thus allowing the near-eye display system 200 to have a more traditional eyeglass appearance. In this implementation, a display housing (omitted from FIG. 2 for clarity of illustration) on the eyeglass frame 204 at the distal periphery of the eyeglass lens 205 contains a micro-display or other display to emit display light representative of AR or VR imagery and in-coupling optic to direct the emitted display light to an in-coupling interface of the PWG 202 in the lens 205, whereupon the display light is propagated through the PWG 202/eyeglass lens 205 toward an out-coupling interface 207 that is located in the eyeglass lens 205/PWG 202 so as to be aligned with an expected position (or expected range of positions) of a corresponding eye of the wearer. In some embodiments, the eyeglass lens 206 likewise implements a corresponding PWG and the system 200 employs corresponding display componentry in the same manner to provide for the display of AR or VR imagery to the other eye of the wearer as well.

The PWG 102 of system 100 of FIG. 1 and the PWG 202 of system 200 of FIG. 2 each operates to convey display light from a proximate display to an eye of the user via multiple reflections of the display light within the body of the PWG as the display light traverses from one end of the PWG proximate to the display to the opposing end of the PWG facing an eye of the wearer. However, unlike a conventional waveguide, these reflections do not rely on TIR; that is, the angle of incidence may be less than the critical angle of the interface between mediums at the point of reflection. Rather than relying on TIR, the PWG instead manipulates the polarization state of the display light as it propagates through the PWG so as to cause the display light to reflect one or more times within the PWG until a light extraction feature is encountered, at which point the polarization state of the display light is changed in a manner that permits the display light to transmit through the surface of the PWG at an out-coupling interface that faces the wearer's eye.

Figure 3:
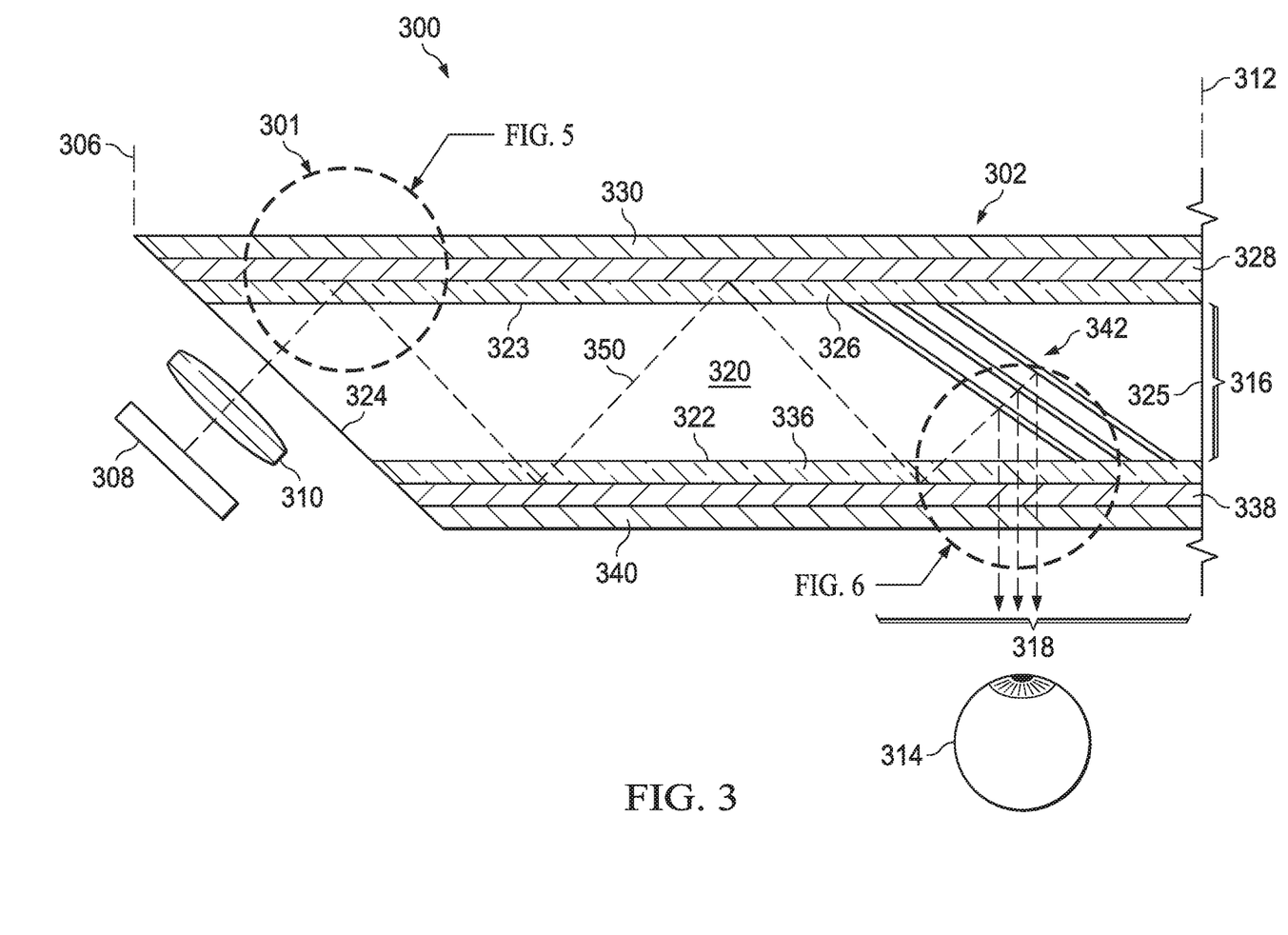
FIG. 3 is a cross-section view of a polarization waveguide with associated display and in-coupling optic in accordance with some embodiments.

FIG. 3 illustrates a cross-section view 300 of a PWG 302 that employs this manipulation of polarization state to provide internal reflection of in-coupled display light in accordance with at least one embodiment. The PWG 302 represents, for example, the PWG 102 of the system 100 and thus the cross-section view 300 can represent the cross-section A-A illustrated in FIG. 1. It should be noted that the dimensions of various features depicted in FIG. 3 may be disproportionate to other features for purpose of illustration of principles of operation.

The PWG 302 extends from one end 306 proximate to a display 308 and in-coupling optic 310 to an opposing end 312 proximate to an expected position 314 of a wearer's eye, and includes an in-coupling interface 316 configured to receive display light from the display 308 via the in-coupling optic 310 and an out-coupling interface 318 to transmit a representation of the display light conveyed by the PWG 302 in an eyeward direction (that is, toward the expected position 314 of the wearer's eye). The display 308 can comprise any of a variety of displays suitable for use in near-eye display systems employing waveguides, such as an organic light emitting diode (OLED) micro-display. The in-coupling optic 310 is disposed between the display 308 and the in-coupling interface 316 and is configured to direct the display light emitted by the display 308 toward the in-coupling interface 316, and in some instances may be configured to collimate the display light in the process. Although depicted as a single bi-convex lens for ease of illustration, the in-coupling optic 310 in some embodiments includes a set of one or more stacked lenses with various lens profiles and configured to impart desired optical manipulations on the display light before entering the PWG 302.

In at least one embodiment, the PWG 302 includes a waveguide substrate 320 extending from end 306 to end 312. The waveguide substrate 320 is composed of a material transparent to the display light, such as glass, optical plastic, and the like. In some embodiments, the waveguide substrate 320 may instead be a region of air as the PWG 302 does not rely on TIR. The waveguide substrate 320 includes two opposing major surfaces 322, 323, with the first major surface 322 being the "eye-facing" surface (that is, the surface facing the wearer's eye) and the second major surface 322 being the "world-facing" surface (that is, the surface facing away from the wearer's eye). In the example of FIG. 3, the surfaces 322, 323 are planar and substantially parallel. However, as illustrated in greater detail with reference to FIGS. 7-9, because the PWG does not rely on TIR, the opposing major surfaces may instead be curved (i.e., non-planar) and/or may be substantially non-parallel to each other (i.e., at a slanted, non-zero, angle relative to each other). The waveguide substrate 320 further includes opposing minor surfaces 324, 325. The first minor surface 324 is located at end 306 and disposed at an acute angle relative to major surface 323 so as to form the in-coupling interface 316 having an optical axis that is not parallel to the major surfaces 322, 323. In other embodiments, the in-coupling interface 316 is implemented as a reflective mirror disposed in the waveguide substrate 320. The second major surface 325 is located at end 312 and may be disposed perpendicular to the major surfaces 322, 323 as shown, or disposed at a non-perpendicular angle relative to major surfaces 322, 323.

Overlying the major surface 322 is a first quarter-wave plate (QWP) layer 326, along with a first polarization beam splitter (PBS) layer 328 overlying the QWP layer 326 such that the QWP layer 326 is adjacent to the major surface 322 and disposed between the PBS layer 328 and the major surface 322. The PWG 302 further may include a linear polarizer (LP) layer 330 overlying the PBS layer 328. Similarly, a second QWP layer 336 overlies the major surface 323 and a second PBS layer 338 overlies the QWP layer 336 such that the QWP layer 336 is adjacent to the major surface 323 and is disposed between the PBS layer 338 and the major surface 323. An LP layer 340 also may be formed overlying the PBS layer 338.

The QWP layers 326, 336 (also known as "retarders") are implemented using material that operates to convert light having a first circularly polarized state to light having a first linearly polarized state, to convert light having a second circularly polarized state to light having a second linearly polarized state, and to convert light having the first linearly polarized state to the first circularly polarized state. More generally, quarter-wave plates, such as the QWP layers 326, 336, transmit light and modify its polarization state without deviating or displacing the beam. In a quarter-wave plate, the retardation which is the phase difference between the polarization component projected along the fast and slow axis is ¼ wave. The QWP layers 326, 336 may be implemented as, for example multi-order, zero-order, or achromatic QWP layers. Examples of materials implementing the QWP layers 326, 336 include calcite or crystalline films, polychromatic films, and the like.

The PBS layers 328, 338 are implemented using material that operates to reflect light having the first linearly polarized state and to transmit light having the second linearly polarized state. Examples include wire grid type PBS layers, dielectric coating type PBS layers, and the advanced polarizing film available from 3M (3M APF). Similarly, the LP layers 330, 340 are implemented using material that operates to transmit light having the second linearly polarized state. Examples include a wire grid polarizer, a calcite polarizer, or a dichroic polarizer.

With the described configuration, light propagating within the waveguide substrate 320 and having the first circularly polarized state that is incident on one of the QWP layers is converted to light having the first linearly polarized state as it propagates through the QWP layer. This converted light with the first linearly polarized state then encounters the overlying PBS layer, which is configured to reflect light having the first linearly polarized state, and thus reflects the light back through the underlying QWP layer. As this light propagates through the QWP layer, the QWP layer converts the polarization state of the light from the first linearly polarized state to the first circularly polarized state, such that the reflected light re-enters the waveguide substrate 320 having the first circularly polarized state. It will be appreciated that this polarization-state-based reflection is independent of the critical angle of the QWP layer/PBS layer interface, and thus is not TIR-based reflection. The PWG 302 utilizes this particular polarization-state-based reflection property of the QWP layer/PBS layer combination to "bound" display light along the length of the waveguide substrate 320, as described in detail below.

To facilitate transmission of reflected display light conveyed by the PWG 302 toward the wearer's eye, the PWG 302 employs a light extraction component 342 disposed in the waveguide substrate 320. In the embodiment of FIG. 3, the light extraction component 342 is illustrated as a set of one or more partially-reflective mirrors 344, 345, 346— (e.g., multi-layer films or a dielectric coating) that extend substantially from major surface 322 to major surface 323 at an angle determined to reflect incident light conveyed within the waveguide substrate 320 toward the out-coupling interface 318. In other embodiments, the light extraction component 342 may be implemented as, for example, a set of Fresnel facets, as described in greater detail below with reference to FIG. 9.

The light extraction component 342 is configured to reflect incident light received via the waveguide substrate 320 in the direction of the out-coupling interface 318, which in turn is aligned with the expected position 314 of the wearer's eye. Further, in at least one embodiment, the light extraction component 342 is configured to change the polarization state of the reflected light from the first circularly polarized state to light having the second circularly polarized state. As a result, when the light reflected by the light extraction component 342 encounters the QWP layer 336, the light is converted from the second circularly polarized state to the second linearly polarized state as it propagate through the QWP layer 336. As the PBS layer 338 and LP layer 340 are configured to transmit light having the second linearly polarized state, the light emerging from the QWP layer 336 is then permitted to pass through the PBS layer 338 and LP layer 340 and propagate to the wearer's eye. As such, the PWG 302 utilizes the circular-polarization state reversal property of the light extraction component 342 to allow the reflected display light to take on the second circularly polarized state that allows the reflected display light to pass through the QWP layer 336, PBS layer 338, and LP layer 340, rather than to continue to be internally reflected within the PWG 302.

The LP layers 330, 340 operate to reduce the light reflected by the PBS layers 328, 338. On the eye-ward side, the LP 340 reduces light that reflects into the user's eye, thereby reducing stray light and ghost images and thus improving image quality. On the world-facing side, the LP layer 330 can reduce the amount of ambient light that is reflected, and thus allow the system 100 to work more like a pair of sunglasses.

Figure 4:
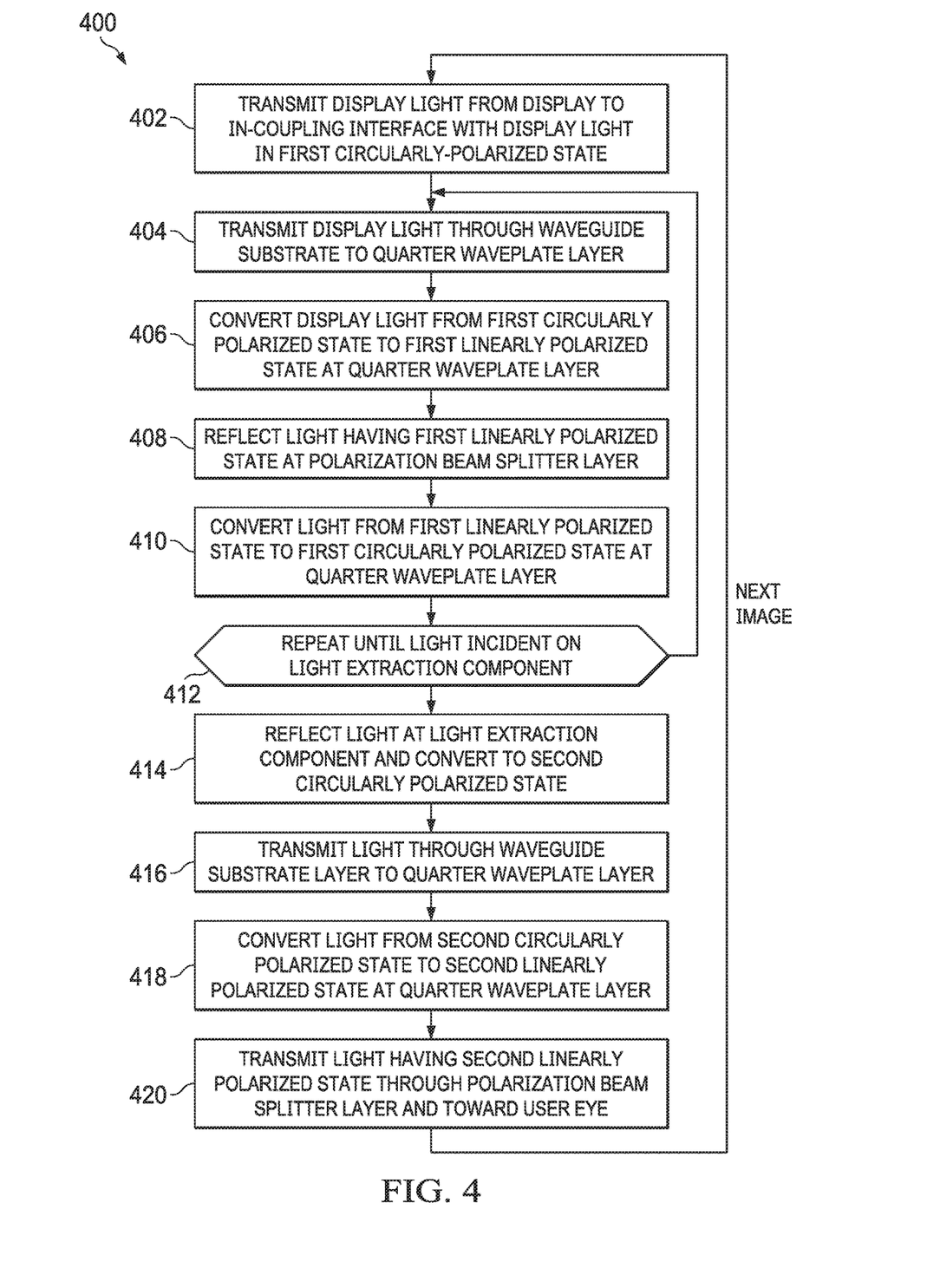
FIG. 4 is a flow diagram illustrating a method of employing a near-eye display system with a polarization waveguide to display imagery to a user in accordance with some embodiments.

FIG. 4 illustrates a method 400 of operation of a near-eye display system employing the PWG 302 of FIG. 3 in accordance with at least one embodiment. The method 400 initiates at block 402 with the display 308 being operated to emit display light 350 representative of a display image, which may include AR or VR content. The in-coupling optic 310 directs the display light 350 into the waveguide substrate 320 of the PWG 302 via the in-coupling interface 316. For purposes of illustration, the first circularly polarized state is the right-handed circularly polarized (RCP) state. However, in other embodiments, the first circularly polarized state may be the left-handed circularly polarized (LCP) state, with the attendant modifications to the other polarization states described herein.

Figure 5:
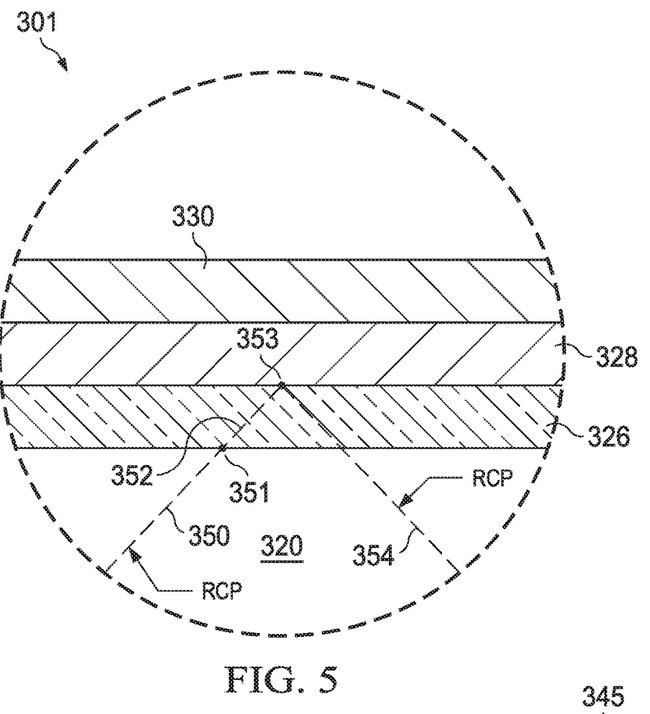
FIG. 5 is an enlarged view of a portion of the cross-section view of the polarization waveguide of FIG. 3 illustrating an operation of an interface between a quarter-wave plate layer and a polarization beam splitter layer of the polarization waveguide in accordance with some embodiments.
Figure 6:
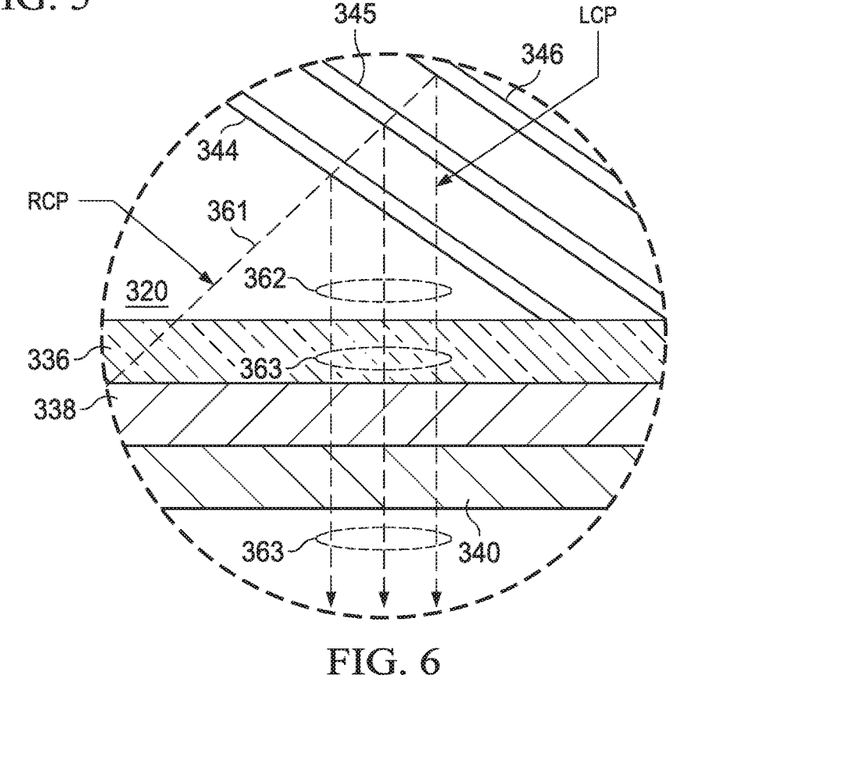
FIG. 6 is an enlarged view of another portion of the cross-section view of the polarization waveguide of FIG. 3 illustrating an operation of interfaces between a light-extraction component, a quarter-wave plate layer, and a polarization beam splitter layer of the polarization waveguide in accordance with some embodiments.

As illustrated by enlarged inset view 301 of FIG. 5, at block 404, the display light 350 propagates through the waveguide substrate 320 at an angle and thus strikes the interface between the waveguide substrate 320 and the QWP layer 326 at a location 351. As the display light propagates through the QWP layer 326, the QWP layer 326 changes the polarization state of the display light to the first linearly polarized state (block 406), which for purposes of example is described herein as a linearly y-polarized state. The resulting modified display light 352 then encounters the PBS layer 328 at location 353, and as the PBS layer 328 is configured to reflect light having the first linearly polarized state (linearly y-polarized), the PBS layer 328 reflects modified display light 352 back to the QWP layer 326 (block 408). As the reflected display light 352 propagates through the QWP layer 326, the QWP layer 326 converts the display light from the linear y-polarized state (the first linearly polarized state) back to the RCP state (the first circularly polarized state)(block 410) such that the display light re-enters the waveguide substrate 320 as reflected display light 354 having the original RCP state.

As represented by block 412 of method 400, the reflection of the display light represented by the process of blocks 404-410 repeats one or more times, with each reflection resulting in the display light re-entering the waveguide substrate 320 in the RCP state and at an angle that propagates the display light along the length of the waveguide substrate 320 toward the light extraction component 342. As illustrated by enlarged inset view 303 of FIG. 6, when conveyed display light 361 falls incident on the partially-reflective mirrors 344-346 of the light extraction component 342, the partially-reflective mirrors 344-346 reflect the conveyed display light 361 as reflected display light 362, and in the process of reflecting the display light convert the polarization state from the RCP state (first circularly polarized state) to a left-handed circularly polarized (LCP) state (second circularly polarized state)(block 414). The reflected display light 362 is propagated to the portion of the QWP layer 336 corresponding to the out-coupling interface 318 (block 416), and as the reflected display light 362 is transmitted through the QWP layer 336, the QWP layer 336 converts the polarization state of the light from the LCP state (second circularly polarized state) to the linearly x-polarized state (second linearly polarized state)(block 418), resulting in converted display light 363. As the PBS layer 338 and LP layer 340 each is configured to transmit light having the linearly x-polarized state, the converted display light 363 is permitted to pass through the PBS layer 338 and LP layer 340 at the region corresponding to the out-coupling interface 318 (block 420) and the emerging converted display light 363 thus propagates from the PWG 302 to the wearer's eye.

The internal reflections within the PWG 302 represented by blocks 404-412 result from manipulation of the polarization state of the conveyed light in view of the polarization-state-specific reflection and transmission properties of the stack of material layers overlying the major surfaces 322, 323 of the waveguide substrate 320, and do not rely on TIR. Thus, the waveguide substrate 320 may be composed of a material with a lower index of refraction, such as an optical plastic, than the waveguide material typically used in conventional TIR-based waveguides (e.g., relatively heavy and expensive optical glass) to achieve a given FOV. Alternatively, a greater FOV may be achieved by the PWG 302 using a material with the same index of refraction as a corresponding TIR-based waveguide. Moreover, because TIR is not required, the waveguide substrate can employ a non-planar shape or non-parallel major surfaces, which typically is impracticable to implement in a conventional TIR-based waveguide.

Figure 7:
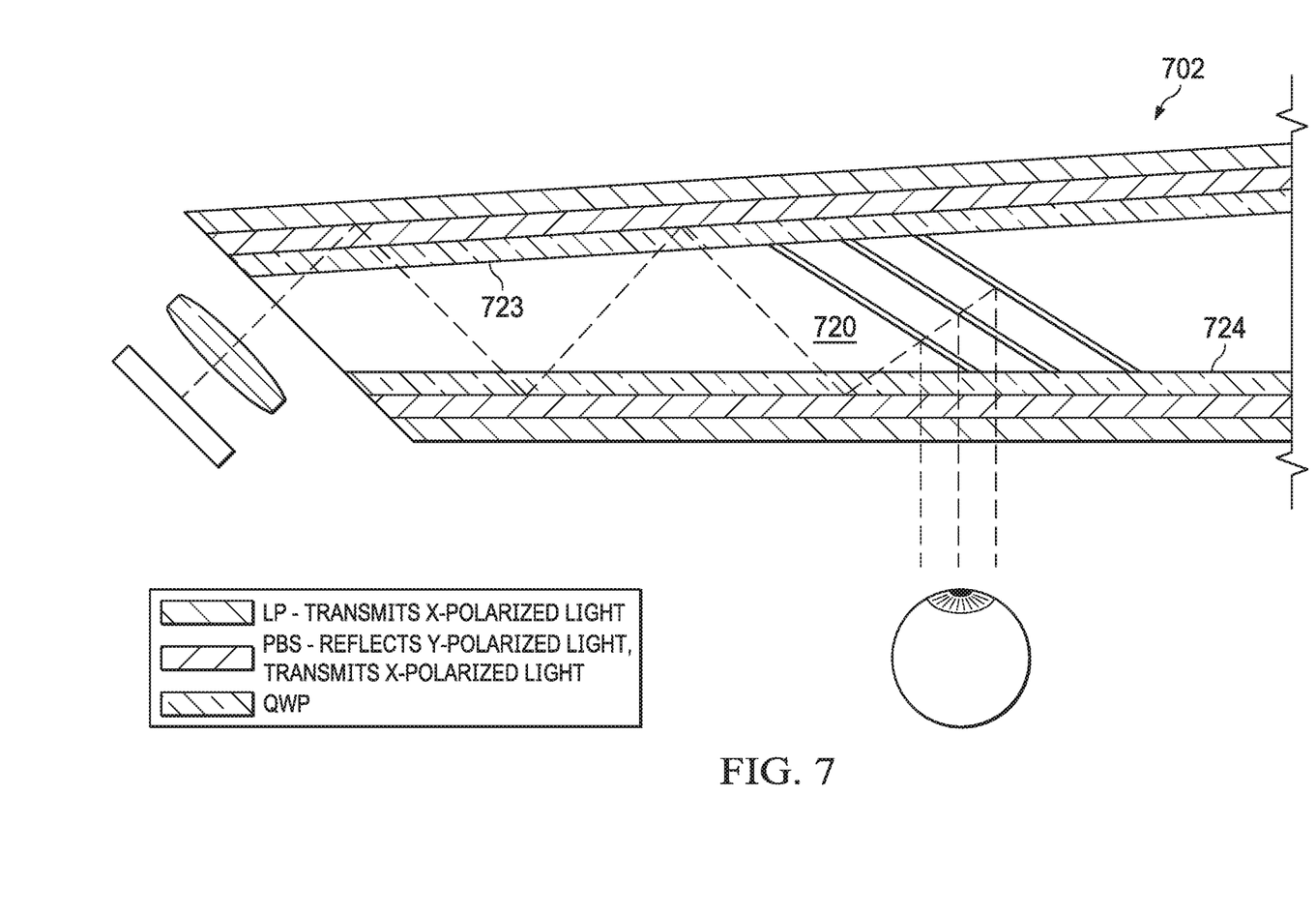
FIG. 7 is a cross-section view of another embodiment of a polarization waveguide having non-parallel, or slanted, opposing surfaces in accordance with some embodiments of the present disclosure.
Figure 8:
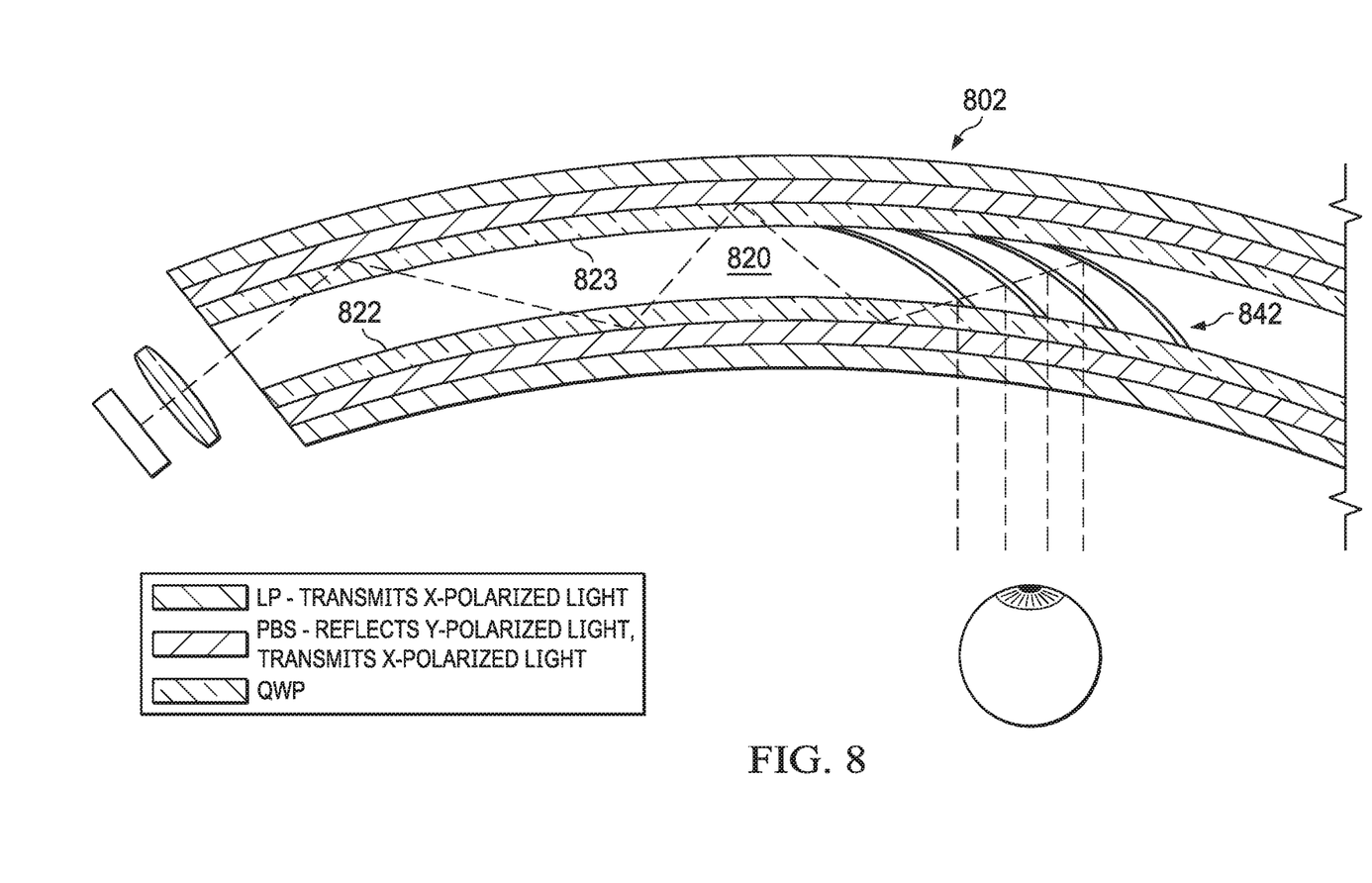
FIG. 8 is a cross-section view of another embodiment of a polarization waveguide having curved opposing surfaces in accordance with some embodiments of the present disclosure.

To illustrate, FIG. 7 illustrates an example PWG 702 in which the waveguide substrate 720 comprises two opposing planar major surfaces 722, 723 which are substantially non-parallel, that is, at a non-zero angle relative to each other. Further, FIG. 8 illustrates an example PWG 802 having a waveguide substrate 820 with opposing major surfaces 822, 823 that are curved (that is, non-planar). In the depicted example, the major surface 822 is a concave surface and the major surface 823 is a convex surface, thereby forming a convex-concave lens or a meniscus lens. In other embodiments, the major surfaces 822, 823 may be curved in different orientations, or only one of the major surfaces may be curved, while the other is planar. Further, the curve formed by a surface may be spherical or aspherical. In this approach, the PWG 802 may employ a light extraction component 842 that has curved partially-reflective mirrors to accommodate the curvature of the major surfaces 822, 823. The ability to employ curved surfaces in this manner permits the PWG 802 to be implemented in the form factor of eyeglass lenses, such as the PWG 202 implemented in the eyeglass lens 205 in the system 200 of FIG. 2. Moreover, the ability to introduce curvature of the major surfaces permits the PWG 802 to introduce optical power greater than zero, and thus allowing the PWG 802 to project enlarged imagery than conventional TIR-based waveguides.

Figure 9:
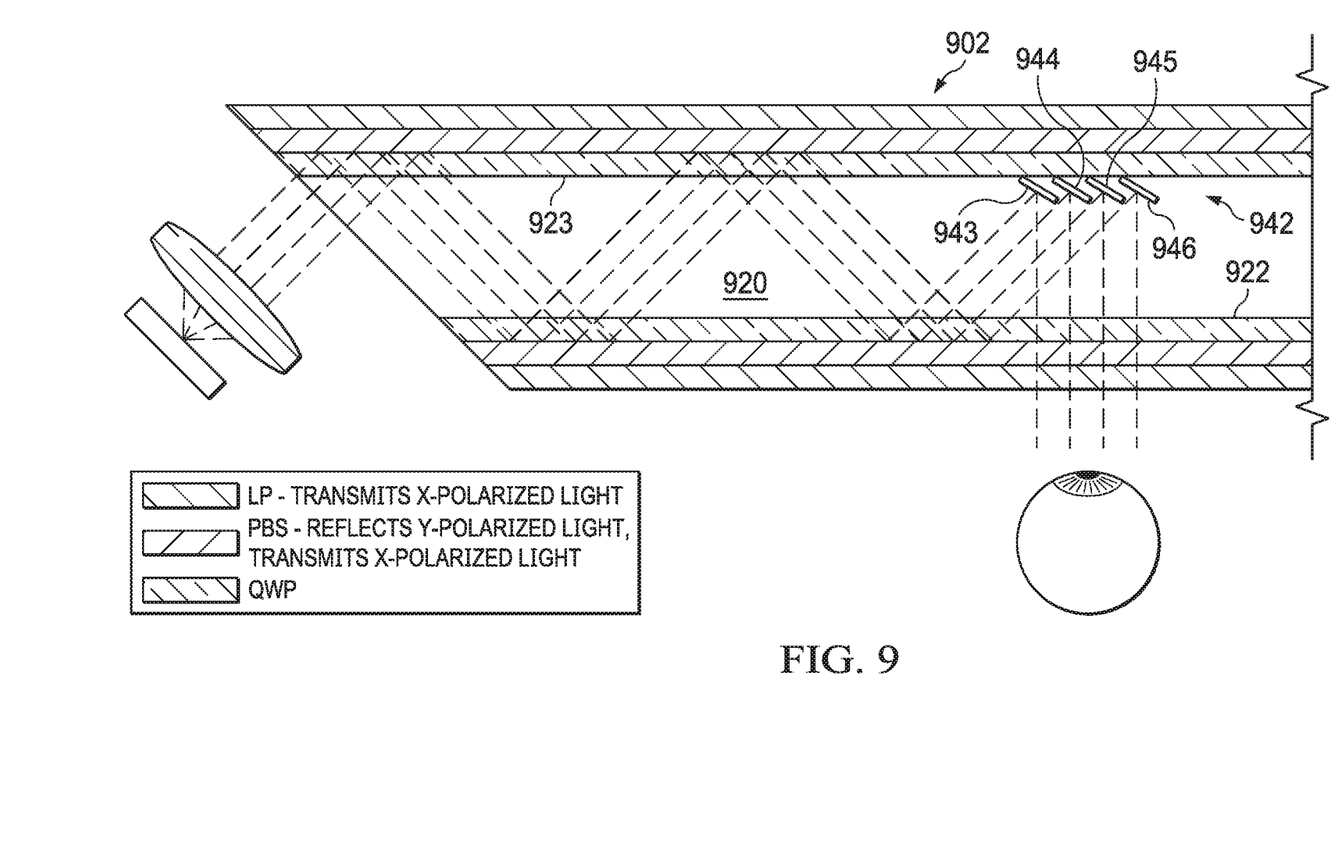
FIG. 9 is a cross-section view of another embodiment of a polarization waveguide utilizing another example of a light extraction component with some embodiments of the present disclosure.

The PWG implementations of FIGS. 3-8 depict the light extraction component of the PWG as a set of partially reflective mirrors. However, the light extraction component of a PWG is not limited this implementation, but instead may be implemented as any of a variety of optical features that reflect incident light while converting the light from the first circularly polarized state to the second circularly polarized state in the process of reflecting the light. To illustrate, FIG. 9 illustrates a PWG 902 that employs an in-coupling optic 910 that collimates display light emitted by the display 308 and a light extraction component 942 that includes a set of Fresnel facets 943, 944, 945, 946 disposed at a major surface 923 of a waveguide substrate 920 so as to reflect the conveyed collimated display light toward the opposing major surface 922 of the waveguide substrate 920. The Fresnel facets can be fabricated on the world side of the substrate 320, and operate like a prism array with partial mirror coating on it. The function of the Fresnel facets along with the partial mirror is to change the handiness of the circularly polarization and expand the pupil size.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a polarization waveguide comprising:
      a waveguide substrate comprising first and second opposing surfaces;
      an in-coupling interface proximate to a first end of the polarization waveguide;

an out-coupling interface proximate to a second end of the polarization waveguide;

a first quarter-wave plate layer overlying the first surface of the waveguide substrate and disposed within the polarization waveguide such that incident light directed into the waveguide substrate via the in-coupling interface initially strikes the first quarter-wave plate layer;

a first polarization beam splitter layer overlying the first quarter-wave plate layer;

a second quarter-wave plate layer overlying the second surface of the waveguide substrate;

a second polarization beam splitter layer overlying the second quarter-wave plate layer; and a light extraction component configured to reflect incident light received in the waveguide substrate toward the out-coupling interface.

2. The apparatus of claim 1, wherein:
the light extraction component comprises a set of one or more partially-reflective mirrors extending substantially between the first and second surfaces of the waveguide substrate in a region of the waveguide substrate aligned with the out-coupling interface.

3. The apparatus of claim 1, wherein:
the out-coupling interface is adjacent to the first surface of the waveguide substrate; and
the light extraction component comprises a set of Fresnel facets disposed adjacent to the second surface of the waveguide substrate and aligned with the out-coupling interface.

4. The apparatus of claim 1, further comprising:
a display configured to emit display light representative of an image; and
an in-coupling optic disposed between the display and the in-coupling interface, the in-coupling optic configured to direct the display light toward the in-coupling interface.

5. The apparatus of claim 4, wherein:
the display is configured to emit the display light having a first circularly polarized state;
the first quarter-wave plate layer and the second quarter-wave plate layer each is configured to convert incident light having a first circularly polarized state to light having a first linearly polarized state, to convert incident light having the first linearly polarized state to light having the first circularly polarized state, and to convert incident light having a second circularly polarized state to a second linearly polarized state;
the first polarization beam splitter layer and the second polarization beam splitter layer each is configured to reflect light having the first linearly polarized state and to transmit light having the second linearly polarized state; and
the light extraction component is configured to change reflected light from the first circularly polarized state to the second circularly polarized state.

6. The apparatus of claim 1, wherein:
the first surface and second surface are substantially parallel.

7. The apparatus of claim 1, wherein:
the first surface and the second surface are substantially non-parallel.

8. The apparatus of claim 1, wherein:
at least one of the first surface and the second surface is a curved surface.

9. The apparatus of claim 8, wherein:
the first surface is a convex surface; and
the second surface is a concave surface.

10. The apparatus of claim 8, wherein:
the curved surface is one of: a spherical curved surface or an aspherical curved surface.

11. The apparatus of claim 8, wherein:
the polarization waveguide has a non-zero optical power.

12. The apparatus of claim 1, further comprising:
a first linear polarization layer overlying the first polarization beam splitter layer; and
a second linear polarization layer overlying the second polarization beam splitter layer.

13. The apparatus of claim 1, further comprising:
an eyeglass frame comprising an eyeglass lens; and
wherein the polarization waveguide overlies the eyeglass lens with the eyeglass lens disposed between the out-coupling interface of the polarization waveguide and an expected position of a corresponding eye of a wearer of the eyeglass frame.

14. The apparatus of claim 1, further comprising:
an eyeglass frame comprising an eyeglass lens; and
wherein the eyeglass lens implements the polarization waveguide and the out-coupling interface is disposed at or adjacent to an eyeward surface of the eyeglass lens.

15. A method for conveying display light from a display to a user's eye in a near-eye display system, the method comprising:
providing a polarization waveguide comprising an in-coupling interface proximate to one end and an out-coupling interface proximate to an opposite end, a waveguide substrate having first and second opposing surfaces, a first quarter-wave plate layer overlying the first surface and disposed within the polarization waveguide such that light directed into the waveguide substrate via the in-coupling interface initially strikes the first quarter-wave plate layer, a first polarization beam splitter layer overlying the first quarter-wave plate layer, a second quarter-wave plate layer overlying the second surface, and a second polarization beam splitter layer overlying the second quarter-wave plate layer, and a light extraction component to reflect incident light received in the waveguide substrate toward an out-coupling interface of the polarization waveguide;
directing display light emitted by a display to the in-coupling interface;
conveying a representation of the display light through the polarization waveguide from the in-coupling interface to the out-coupling interface; and
transmitting the representation of the display light eyeward from the out-coupling interface.

16. The method of claim 15, wherein conveying the representation of the display light through the polarization waveguide comprises reflecting light within the polarization waveguide at an angle less than a critical angle of an interface between two materials of the polarization waveguide at a point of reflection.

17. The method of claim 15, wherein conveying the representation of the display light comprises:
receiving the display light having a first circularly polarized state at the in-coupling interface;
converting the display light from the first circularly polarized state to a first linearly polarized state at the first quarter-wave plate layer;
reflecting the display light having the first linearly polarized state at the first polarization beam splitter layer; and converting the reflected display light from the first linearly polarized state back to the first circularly polarized state at the first quarter-wave plate layer.

18. The method of claim 17, wherein conveying the representation of the display light further comprises:
reflecting, at the light extraction component, a reflected representation of the display light in a direction of the out-coupling interface, wherein reflecting the reflected representation of the display light converts the reflected representation of the display light from the first circularly polarized state to a second circularly polarized state;
converting the reflected representation of the display light from the second circularly polarized state to a second linearly polarized state at the second quarter-wave plate layer; and
transmitting the reflected representation of the display light having the second linearly polarized state in an eyeward direction through the second polarization beam splitter layer.

19. A near-eye display system comprising:
a polarization waveguide having an in-coupling interface disposed proximate to a first end and an out-coupling interface disposed proximate to an opposite second end, the polarization waveguide configured to convey light incident at the in-coupling interface to the out-coupling interface by inducing multiple changes in a polarization state of the light as the light traverses the polarization waveguide, the multiple changes in polarization state being induced through a first plurality of layers on a first surface of a pair of opposing surfaces of a waveguide substrate and a second plurality of layers on a second surface of the pair of opposing surfaces, wherein at least a portion of the multiple changes in polarization state induces the light to reflect within the polarization waveguide between and incident on the first plurality of layers and the second plurality of layers.

20. The near-eye display system of claim 19, further comprising:
a display proximate to the first end, the display configured to emit light representative of an image; and
an in-coupling optic disposed between the display and the in-coupling interface, the in-coupling optic configured to direct the light from the display to the in-coupling interface.

21. The near-eye display system of claim 19, further comprising:
an eyeglass frame having an eyeglass lens; and
wherein the polarization waveguide is implemented in the eyeglass lens.

22. The near-eye display system of claim 19, further comprising:
an eyeglass frame having an eyeglass lens; and
wherein the polarization waveguide overlies the eyeglass lens.

23. The near-eye display system of claim 19, wherein the first plurality of layers and the second plurality of layers each include:
a first layer overlying the waveguide substrate and configured to change incident light having a first circularly polarized state to light having a first linearly polarized state, to change incident light having the first linearly polarized state to light having the first circularly polarized state, and to change incident light having a second circularly polarized state to light having a second linearly polarized state; and
a second layer overlying the first layer and configured to reflect incident light having the first linearly polarized state and to transmit incident light having the second linearly polarized state; and
wherein the polarization waveguide further includes:
a light extraction component disposed within the waveguide substrate and configured to reflect incident light in a direction toward the out-coupling interface and to change a polarization state of the reflected light from the first circularly polarized state to the second circularly polarized state.

* * * * *